INVENTOR
TIMOTHY E. O'CONNOR

United States Patent Office 3,261,667
Patented July 19, 1966

1

3,261,667
PROCESS FOR THE PRODUCTION OF METAL BORIDES AND NITRIDES
Timothy Edmond O'Connor, Brandywine Hundred, Del., assignor to E. I. du Pont de Nemours and Company, Wilmington, Del., a corporation of Delaware
Original application Jan. 25, 1960, Ser. No. 4,252. Divided and this application June 19, 1963, Ser. No. 301,222
2 Claims. (Cl. 23—191)

This is a division of application Serial No. 4,252, filed January 25, 1960.

This application is a continuation-in-part of copending applications Serial No. 717,543, filed February 26, 1958, now abandoned; Serial No. 744,006, filed June 23, 1958, now abandoned; Serial No. 744,680, filed June 26, 1958, now abandoned; and Serial No. 789,518, filed January 28, 1959, now abandoned.

This invention relates to boron nitride and is more particularly directed to turbostratic boron nitride and processes for its production.

Heretofore, boron nitride has been made by numerous methods, all of which, however, have been quite costly, or have been technically difficult to practice or have yielded relatively impure products. Among the commercial methods employed in the past have been those involving the heating of boron trichloride with ammonia at temperatures high enough to cause simultaneous breakdown of by-product ammonium chloride to nitrogen, hydrogen, and hydrogen chloride, and the method of reacting boron trichloride with molten aluminum in the presence of nitrogen gas. In 1902, L. Möser and W. Eidmann (Ber 35, 535; 1902) described the reaction of boric oxide and ammonia and although this process has been frequently studied in view of improvement, the physical properties of boric oxide at the temperatures necessary to effect a reaction render the equipment design quite difficult and result in impure and uneconomical boron nitride. A marginal improvement has been obtained by using boric oxide on an inert extraneous support such as tricalcium phosphate, carbon black, or preformed boron nitride, at elevated temperatures with ammonia. Most of these methods suffer from the difficulty of securing boron nitride free of ionic or metallic impurities at a moderate cost. The use of preformed boron nitride as a support in the latter method gives a low production rate and requires high temperatures while the use of a support other than boron nitride requires the subsequent removal of the support by aqueous or acid elution at a stage where the physical properties of the boron nitride render it susceptable to hydrolysis. The separation of boron nitride from the latter type of support is further aggravated by the large amount of support (up to four times the weight of the starting boric oxide) which must be removed. Methods such as these are likely to give rise to the generation of ionic impurities which mitigate against the use of the boron nitride as an electrical insulator.

Because of the importance of boron nitride as an electrical insulator and high frequency dielectric over a very wide temperature range, as an atomic reactor structural material and neutron shield, as a material of construction for components of rockets and supersonic aircraft, as a component of pumps for handling certain molten metals, and as a high temperature lubricant, a significant need has arisen for cheaper and more efficient methods for manufacturing boron nitride.

In 1869, it was reported by H. Darmstadt (Liebig's Annallen der Chemie, 151, 255 (1869)) that boron nitride can be obtained by heating boric acid with urea and washing the resulting mixture with aqueous hydrochloric acid. Further experience with the method of Darmstadt as well as some of the above-mentioned methods indicated that only fraction yields (up to 28%) of boron nitride of substantial impurity could be obtained by these methods (Ullmann, Enzyklopadieder Technische Chemie, Auflage 2 p. 542). Recently a product which analyzed 27.2% boron and 22.6% nitrogen was obtained in a yield of 60.5% with the Darmstadt procedure. Thus, while the early method did indeed produce demonstrable quantities of a nitrided boron composition, the yield was so poor and the quality of the product so inadequate that the expensive procedures hereinabove mentioned have been resorted to as the best practical methods of manufacture.

An object of the present invention is to provide an inexpensive novel method for manufacturing boron nitride of high purity and at high yields. Another object is to provide a process for the manufacture of boron nitride which utilizes moderate temperatures and does not require an extraneous support for the reacting boron compound.

It has been discovered in accordance with this invention that boron nitride of high purity can be manufactured efficiently and at relatively low cost by heating boric acid with certain nitrogenous materials and removing volatile by-products, at least the final portion of the heating being conducted in the presence of added amonia in the absence of any extraneous supports. More particularly the invention provides a process for manufacture of boron nitride which comprises heating boric acid with at least one nitrogenous material selected from the class consisting of urea, biuret, triuret, cyanuric acid, ammelide, melamine, thiourea, guanidine, aminoguanidine, cyanamide, dicyandiamide, semicarbazide, and thiosemicarbazide, removing water and any other volatiles, and with at least the final portion of the heating being conducted in the presence of added ammonia in the absence of any extraneous support. In the preferred embodiment, the invention provides a process for manufacture of boron nitride which comprises heating orthoboric acid with at least one of the compounds selected from the class consisting of urea, cyanamide, dicyandiamide, thiourea, biuret, and guanidine in a mole ratio of 1 mole of boric acid per 1 to 2 moles of the above-mentioned compounds, at a temperature usually not exceeding 150° C., removing water from the reaction zone during the ensuing condensation by applying subatmospheric pressure thereupon until more than about 60% of 2 moles of water per mole of boric acid employed is removed, followed by additional heating of the condensation product above 150° C. but preferably not exceeding about 400° C., removing additional water and other volatiles from the reaction during the heating preferably in the absence of molecular oxygen (e.g., in a stream of ammonia or other carrier gas such as nitrogen) until the residue is converted into a solid, agitating said solid and adding ammonia either in combination with or in the absence of an inert carrier gas when the temperature exceeds about 400° C. and further heating the intermediate solid to about 700° C. to 1000° C., whereupon the intermediate solid which is formed above 400° C. is converted to substantially pure boron nitride in good yield.

The processes of the invention have numerous advantages over those of the prior art. It does not require the use of extreme temperatures at a stage in the process wherein corrosive materials are encountered.

A distinctive feature of this invention is that the intermediate residues which are formed at temperatures above 400° C., and which are ammoniated to boron nitride are solids and require no supports to enhance their conversion to white boron nitride, which is substantially free of ionic impurities and, in fact, contains minor amounts of oxygen as the only significant impurity. These intermediate residues consist essentially of the combined elements boron, nitrogen, and oxygen, although in some instances minor amounts of carbon and hydrogen are present; in these cases these elements are removed as volatile products on heating to higher temperatures (600° C.). In the preferred embodiment of this invention the atomic ratio of nitrogen to boron present in the intermediate residues generally lies between 0.3 and 0.7.

Although the exact structures of these intermediates are not known, they are believed to be substantially self-supporting, solid, porous matrices of the combined elements, boron, nitrogen, and oxygen. The intermediate residues of this invention readily react with ammonia at temperatures above 350° C. to give boron nitride and water. Furthermore, the extent of conversion of the intermediate oxygenated boron residue to boron nitride increases with temperature, and boron nitride compositions with a nitrogen content above 54% N have been obtained at a final maximum reaction temperature of 900° C. Thus, the practice of this invention, using these intermediate residues, leads to a pure boron nitride requiring no further substantial purification and furthermore achieves this object at moderate temperatures with consequent substantial savings in cost of reactor equipment.

Still further advantages of the process of the present invention are as follows: (1) generally no washing step is involved; (2) the starting materials are such that they are inexpensive when in pure form; (3) thin film techniques which involve removal of product from supporting solids are eliminated; (4) yields are exceptionally high.

The mole ratio of boric acid to the second compound or compounds which are employed in the practice of the invention is generally close to 1:1. An excess of the second compound is frequently helpful. The excess should not be so large as to involve a wastage of the second compound and excessively long reaction times to convert the materials to a solid. About 1-2 moles of the second compound per mole of boric acid are preferred. Less than 1 mole of the second compound per mole of boric acid can be employed but is less advantageous since the intermediate solid which is formed in the heating at about 400° C. is an oxygenated product which adheres to the reactor walls.

In some instances (e.g., when urea or thiourea is used) the initial product may be a condensation product which may still be liquid at the lower portion of the temperature range (around 130° C.) but upon further elimination of volatiles during heating, the material becomes a friable solid and remains as a solid throughout the remainder of the reaction. When the condensation product is transformed to the intermediate solid and the reaction is essentially complete as evidenced by reduction in the rate of evolution of volatiles, the material is heated above 400° C. in the presence of ammonia. In the preferred manner of condensing the components at a relatively low temperature, the undesirable reaction of the decomposition of the organic nitrogenous material and the self-condensation of boric acid is held to a minimum. The removal of water and other volatiles is preferably accomplished at subatmospheric pressure below 150° C. and by the use of an inert gas sweep (e.g., nitrogen, carbon dioxide, or helium) between 150° C. and 400° C. The heating of the intermediate solid above 400° C. in the absence of ammonia does not result in its conversion to pure boron nitride but results in a residual intermediate containing boron, nitrogen, and up to 50% by weight of oxygen. The preferred method of ammonia addition is recited above; however, ammonia has been used in place of the gas sweep in the temperature range of about 150° C. to 400° C. and may be used during the entire heating period.

Organic nitrogenous materials which are operable in the present invention include urea, biuret, triuret, cyanuric acid, ammelide, melamine, thiourea, guanidine, aminoguanidine, semicarbazide, thiosemicarbazide, cyanamide, dicyandiamide, ammeline, and salts of the appropriate foregoing with volatile acids. As is well known, some of the above materials can be converted to salts by reaction with volatile or nonvolatile acids. It is considered desirable to use salts of the organic nitrogenous materials, which in the practice of the invention do not leave a residue of ionic impurity in the final boron nitride such as those derived from volatile acids. By the term "volatile acid" is meant any acid with a boiling point less than 400° C. at atmospheric pressure or an acid which upon heating to less than 400° C. is decomposed leaving substantially no ionic residue. Generally "volatile acids" are those which may be removed by heating during the formation of the intermediate solid in the process of this invention. Obviously, the salts which are formed from the above acids should condense with boric acid under the conditions of the instant process. It is believed that nonvolatile acids such as sulfuric acid and phosphoric acid may be used but are undesirable in that inefficient washing procedures may be required for the removal of the ionic impurity resulting therefrom. Alkyl and aryl substituted derivatives of the above-mentioned group of nitrogenous materials are also operable, but in some instances are less desirable in that their use may lead to the deposit of elemental carbon in the final product.

Boric acid as used herein includes orthoboric acid, metaboric acid, pyroboric acid, and condensed boric acids. When it is desired to form the final boron nitride at a temperature below 1000° C., orthoboric acid is preferred. Somewhat higher ammoniation temperatures may be required when the other forms of boric acid mentioned above are used in the initial reaction and may require that final temperature be in excess of 1000° C. Commercial ureas are definitely operable in the process of this invention and are included in the term "urea" as used herein. These commercial ureas may contain quantities of urea self-condensation products and possible trace impurities peculiar to the particular process used in the manufacture of the urea. One skilled in the art recognizes that at elevated temperatures ammonia exists in a reversible equilibrium with nitrogen and hydrogen and that the extent of the equilibrium may be affected by the presence of certain catalysts. (Chemical Elements and Their Compounds, Sidgwick, vol. 1, page 658.) Such gaseous mixtures are included in the term "ammonia" as used herein.

The boron nitride produced by the process of this invention has a turbostratic structure. The term "turbostratic," as is well understood by crystallographers, describes a layered structure in which successive layers show random mutual orientation.

It is well known in the art that boron nitride is a polymeric material. Physically, the material has a layered structure consisting of stacks of lamellae. Each lamella consists of fused borazene rings. Such a stack of lamellae is sometimes referred to as "a parallel layer group." There is partial or complete mutual orientation of the lamellae in the parallel layer groups of the boron nitrides produced by processes known heretofore. These materials possess partial or complete three-dimensional order. Boron nitride exhibiting this order is here referred to as "crystalline."

Boron nitride produced according to this invention, however, shows a complete lack of three-dimensional order among its lamellae. Crystallographic studies, using X-ray techniques, to be more particularly described below, show that while the boron nitride of the present invention has significant amounts of parallel layer groups, composed of stacked lamellae, there is zero probability of mutual orientation among successive lamellae in these stacks. This is illustrated by the lower right-hand insert of FIGURE 1 of the drawing. The layers or disks in the insert represent lamellae composed of fused borazene rings. It will be seen that these lamellae, while frequently superimposed to form stacks, show no regular mutual orientation among successive lamellae in any stack. The term "turbostratic" is intended to define a boron nitride exhibiting this lack of three-dimensional order.

In the present state of the crystallographic art, the assignment of a turbostratic structure to the boron nitride of the present invention is based on an examination of its X-ray diffraction pattern and a comparison of this pattern with the diffraction pattern of crystalline boron nitride.

The samples were investigated at ambient room temperature by X-ray diffraction techniques, using the standard diffractometer method in order that the profiles as well as peak positions of the diffraction peaks be recorded. This method is set out in X-ray Diffraction Procedures for Polycrystalline and Amorphous Materials, by H. P. Klug and L. E. Alexander, Wiley 1954.

The standard parafocusing reflection arrangement of the diffractometer was used with copper radiation and nickel foil at least 0.001 inch thick for a filter. Diffracted radiation was detected by a flow proportional counter using argon, and the radiation intensity was recorded automatically on a strip chart recorder as a function of $2\theta$, where $\theta$ is the Bragg angle. Pulse height selection served to further monochromatize the diffracted radiation. Powder samples were mounted in the usual manner in standard aluminum sample holders. The samples were compacted in the holders in such a way that the sample face presented to the incident X-ray beam was smooth, flat, and flush with the holder surface. The samples were at least 1.5 mm. thick and completely intercepted the incident beam throughout the selected Bragg angle range.

The description of the diffraction patterns is limited to $2\theta$ angles between 10° and 58°, which is a range sufficient to characterize the samples.

Figure 2:
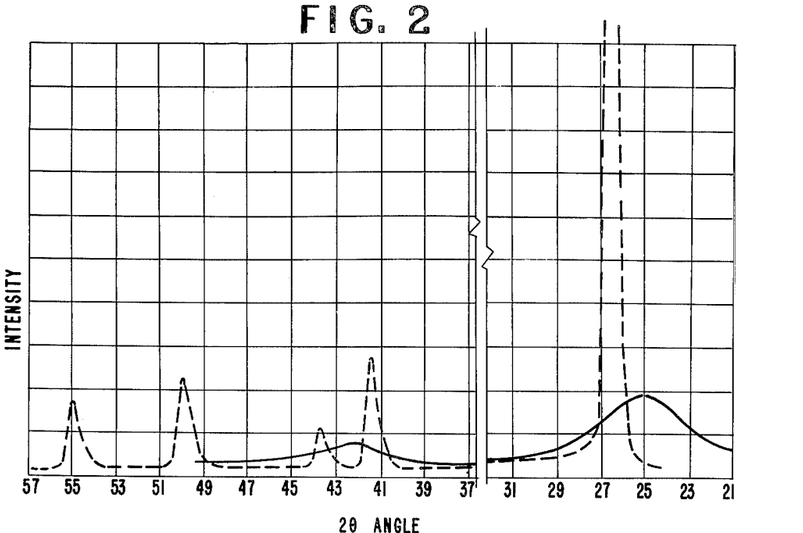
FIGURE 2 shows two superimposed graphs. The solid line represents the X-ray diffraction pattern of turbostratic boron nitride produced according to this invention. The broken line represents the X-ray diffraction pattern of crystalline boron nitride.

Referring to FIGURE 2, it will be seen that the X-ray diffraction pattern of turbostratic boron nitride, represented by the solid line, shows two significant and broad diffraction peaks, with peak positions at approximately 25.0° and 42.4° in $2\theta$ units. The widths of these two major peaks may be described by the angular width at ½ maximum intensity and in this case were approximately 5.8° and 3.8° in $2\theta$ units for the peaks at 25.0° and 42.4°, respectively. The relative integrated intensity of the peak at 25.0° was 2.76 times larger than the relative integrated intensity of the peak at 42.4°.

With further reference to FIGURE 2, it will be seen that the diffraction pattern of a crystalline boron nitride, represented by the broken line, shows within the designated angular range five very narrow and intense diffraction peaks having positions of maximum intensity at approximately 26.75°, 41.59°, 43.84°, 50.13°, and 55.09°, respectively. The half maximum widths of the peaks at 26.75°, 41.59°, 43.84°, 50.13°, and 55.09° were approximately 0.39°, 0.28°, 0.31°, 0.41°, and 0.39°, respectively. The integrated intensities of these peaks were approximately 63, 85, 32.2, 81.7, and 44.3, respectively.

Table I shows the $d$-spacings and corrected relative intensities of this crystalline boron nitride.

TABLE I.—CRYSTALLINE BORON NITRIDE

| (h, k, l) | $2\theta$ | d(A.) | $F^2$ (h, k, l) |
|---|---|---|---|
| (002) | 26.75 | 3.330 | 674 |
| (100) | 41.59 | 2.170 | 75 |
| (101) | 43.84 | 2.066 | 16 |
| (102) | 50.13 | 1.820 | 57 |
| (004) | 55.09 | 1.667 | 225 |

The d-spacings for the crystalline boron nitride were calculated according to the well-known Bragg equation, $\lambda = 2d \sin \theta$, where $\theta$ is Bragg angle and $\lambda$ is the X-ray wavelength: $\lambda = 1.542$ A., the wavelength for $CuK\alpha$ radiation. The $F^2$ data on the crystalline boron nitride are normalized to $F^2$ (100).

Because of the narrowness of the diffraction peaks, accurate parallel layer group parameters were not determined for crystalline boron nitride. The parallel layer group parameters, $La$ and $Lc$, are defined as the values obtainable by means of the usual Scherrer formulae $$L = \frac{k\lambda}{\cos \theta \sqrt{B^2 - B_1^2}}$$

where $k = 0.9$ (for $Lc$ determination) or 1.84 (for $La$ determination), $\lambda = 1.542$ A., and $B_1$ is the contribution to the half maximum breadth of diffraction peaks by instrumental factors. $La$ is calculated using $\theta$ (100) and the half maximum breadth (B) of the (100) peak. $Lc$ is calculated using $\theta$(002) and the half maximum breadth (B) of the (002) peak. $La$ and $Lc$ are usually interpreted in crystallographic analysis as average crystallite dimensions along the $a$ and $c$ unit cell directions. In the case of boron nitride $La$ may be considered as an average layer diameter of the stacked layers and $Lc$ may be considered as an average parallel layer group thickness. While the average parallel layer group parameters of the crystalline boron nitride material are not determinable with a high degree of accuracy from the data in Table I, $La$ and $Lc$ have values in excess of 150 A. when allowance is made for instrumental broadening.

Table II presents the d-spacings and average parallel layer group parameters of a typical preparation of turbostratic boron nitride made by the process of this invention.

TABLE II.—TURBOSTRATIC BORON NITRIDE

| (h, k, l) | $2\theta$ | d(A) | B | L(A) |
|---|---|---|---|---|
| (002) | 25.0 | 3.56 | 5.8 | 14 = Lc |
| (10) | 42.4 | 2.13 | 3.8 | 46 = La |

The $d$-spacings in Table II were calculated according to the Bragg formula given above. The $d$ (002) may be considered as the average interlayer spacing. It should be noted that this spacing is slightly larger than the corresponding (002) of crystalline boron nitride, an effect possibly arising from the somewhat poorer stacking efficiency resulting from lack of mutual layer orientation. $Lc$ was calculated from the Scherrer formula given above, neglecting the very small effect of instrumental broadening.

The value of $Lc$ indicates an average of only 3 to 4 layers per random parallel layer grouping.

The turbostratic structure of the boron nitride of this invention is based on the position of the diffraction peaks in the diffraction pattern, the relative integrated intensities of these peaks, and the approximate coincidence of these peaks with the positions of the (002) and (100) peaks of crystalline boron nitride.

It has been shown theoretically and experimentally that for turbostratic materials, the peak positions (position of maximum intensity) of the two-dimensional $(h, k)$ reflections are a function of the average diameter $(La)$, the peaks being displaced toward larger Bragg angle from the corresponding $(h, k, 0)$ reflection in the three dimensionally ordered material, the displacement increasing with decreasing $La$ values. The peak position of the (10) reflection in Table II relative to the (100) reflection of crystalline boron nitride (Table I) can thus be ascribed to the relative sizes of the layer diameters of these materials. The position of the (10) diffraction peak of the turbostratic boron nitride and its displacement relative to the (100) peak of the crystalline boron nitride gives a value of 40 A. for the average layer diameter using the formula of Warren. This $La$ is in excellent agreement with that given in Table II which was calculated using the ½ maximum breadth of the (10) peak and the Scherrer equation modified by Warren wherein $k=1.84$ (see J. Applied Phys. 13 364–77 (1942) for both methods). In calculating $La$ as given in Table II, the small effect of instrumental broadening was neglected.

The diffraction peak profile of the (10) reflection of the turbostratic boron nitride is in close agreement with the peak profile, calculated for two-dimensional reflections from turbostratic materials, according to the general theoretical analysis of Warren, [Phys. Rev. 59, 693–98 (1942)], and using $La=40$ A. and normalizing to the maximum intensity. This further confirms that the material of this invention is a turbostratic material.

In addition to the two peaks in the angular range considered, the turbostratic boron nitride also gives a weaker two-dimensional (11) reflection at greater angle than $2\theta=58°$.

Some samples of boron nitride made by the process of this invention also give a diffraction pattern containing, in addition to the (002), (10), and (11) peaks, an extremely weak and extremely broad diffraction peak between the (10) and (11) reflections. This peak can be ascribed to the (004) reflection, i.e., the second order of the (002) peak, and can possibly be theoretically ascribed to a smaller deviation from the observed average interplanar spacing.

The turbostratic boron nitride differs from crystalline boron nitride in the absence of detectable general $(h,k,1)$ reflections, i.e., in the absence of reflections other than (001) and $(h,k, 0)$ or $(h,k)$ reflections. Specifically, the boron nitride of this invention is one whose diffraction pattern shows no detectable diffraction peaks at approximately 43.8° and 50.1° in $2\theta$ unit using $CuK\alpha$ radiation and using the experimental techniques described above.

Figure 1:
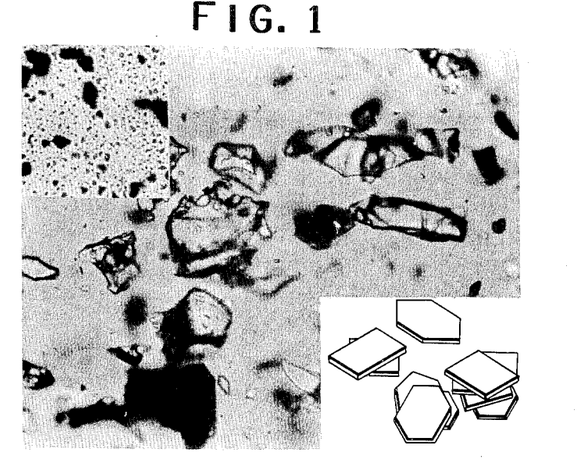
FIGURE 1 is a photomicrograph, at a magnification of 1000 diameters, of turbostratic boron nitride particles produced according to this invention, after grinding. The insert in the upper left-hand corner is a photomicrograph of crystalline boron nitride particles. The insert in the lower right-hand corner is an artist's representation of the lamellae of turbostratic boron nitride, showing their lack of three-dimensional order.

The boron nitride of the present invention shows other gross differences from crystalline boron nitride. As prepared by the processes of the present invention, the boron nitride is obtained as a white powder with a rough and gritty feel. When subjected to mild grinding, as for example, with a pestle and mortar, the material fractures conchoidally and the individual fragments then show the typical appearance of conchoidally fractured particles and are quite translucent. Such particles are illustrated by FIGURE 1. In comparison, the particles of crystalline boron nitride, illustrated by the insert in the upper left-hand corner, are platelets, have more regular edges, are somewhat opaque, and have a talc-like texture.

Turbostratic boron nitride has the novel and unexpected property of not being converted to crystalline boron nitride by thermal annealing on heating to elevated temperatures in an inert atmosphere. In this it differs markedly from the boron nitride materials made by processes known heretofore. The latter materials, as is well known in the art, gradually increase in degree of crystallinity through a thermal crystallization process on heating to temperatures above 1000° C. and attain a high degree of crystallinity, as determined by X-ray diffraction techniques, on heating to about 1500° C. The boron nitride of this invention, however, can be heated in an inert atmosphere to temperatures of about 1700° C. before the material shows signs of crystallization, as evidenced by the presence of three-dimensional ordering or mutual orientation of the lamellae in the parallel layer groupings, as determined by X-ray crystallographic analysis by the aforementioned methods. In some instances, the boron nitride, as made by the methods of this invention, can be heated to temperatures above 2000° C. without showing evidence of crystallization. This is the case when the boron nitride has an atomic ratio of nitrogen to boron in excess of 0.93. Such boron nitrides are readily obtainable by the processes of this invention without the use of reaction temperatures in excess of 1000° C.

When a turbostratic boron nitride, in which the atomic ratio of nitrogen to boron is close to a value of 1.0, is heated to about 2000° C., either in an atmosphere of an inert gas or in a vacuum, the material dissociates into its elements.

The turbostratic boron nitride of this invention can be further differentiated by its reactivity from the boron nitrides produced heretofore. Previously known boron nitride is an extremely inert substance and will withstand several hours' contact with aqueous hydrochloric acid without decomposition. The boron nitride of the present invention, however, is hydrolyzed on addition to cold water, with considerable development of heat and the evolution of ammonia. In some instances, the rate of heat evolution is great enough to heat the water close to the boiling point. This hydrolysis was found to be about 50 mole percent after a 30-minute contact with boiling water.

The surface area of boron nitride prepared according to this invention usually is in excess of about 40 m.$^2$/g., as measured by the standard nitrogen desorption method. In some instances a boron nitride with a surface area as high as 100–250 m.$^2$/g. is obtainable. This is particularly the case when the preferred embodiment of the processes of this invention is employed, wherein the condensation of the boric acid with the nitrogenous component to give the solid intermediates of this process is effected under reduced pressure. In comparison, crystalline boron nitride has a surface area of 2.9–25 m.$^2$/g.

Turbostratic boron nitride also differs from crystalline boron nitride in its displacement of n-hexane. Turbostratic boron nitride produced according to this invention displaces 1.72–1.78 grams of n-hexane per cubic centimeter. In comparison, crystalline boron nitride displaces 2.00–2.32 grams of n-hexane per cubic centimeter, and is clearly a denser substance than turbostratic boron nitride.

Boron nitride as made heretofore is a refractory material. Much of the usefulness of this material until now was derived from its chemical inertness. The boron nitride of this invention, however, has a high surface area and a turbostratic structure containing parallel layer groups whose dimensions are minute by comparison with the parallel layer groups of crystalline boron nitride. Furthermore, the lamellae in the parallel layer groups of the turbostratic boron nitride are separated by a greater interlamellar spacing than in crystalline boron nitride, so that this turbostratic boron nitride has a relatively open structure.

As a consequence of these structural features, the boron nitride of this invention reacts with a variety of metal oxides at temperatures above 1000° C. to give a variety of metals, metal nitrides, and metal borides. The metal oxides which have been found reactive are the oxides of aluminum, titanium, zirconium, vanadium, tungsten, niobium, chromium, nickel, molybdenum, tantalum, and lathanum.

The reaction of the turbostratic boron nitride with the metal oxide is effected by admixing the solid components and then heating to the desired temperature, preferably in an atmosphere of nitrogen or other inert gas. Typical reactions of turbostratic boron nitride with metal oxides are summarized in Table III.

TABLE III.—REACTION OF BORON NITRIDE WITH METAL OXIDES

| Metal Oxide | Mole Ratio, BN:Metal Oxide | Temp., ° C. | Products Identified* |
|---|---|---|---|
| $Al_2O_3$ | 2:1 | 1,800 | AlN. |
| $TiO_2$ | 2:1 | 1,400–1,800 | TiN. |
| $ZrO_2$ | 2:1 | 1,600–1,900 | $ZrB_2$+ZrN. ZrB. |
| $V_2O_4$ | 2:1 | 1,600–2,000 | $VB_2$ |
| $WO_3$ | 4:1 | 1,400 | W metal. |
| $Nb_2O_5$ | 10:1 | 1,750 | $\delta Nb_3B_4$. |
| $Cr_2O_3$ | 3:1 | 1,600 | $\gamma CrB$. |
| $Ni_2O_3$ | 4:1 | 1,450 | Ni metal. |
| $MoO_3$ | 2:1 | 1,600 | Mo Metal + $\alpha Mo_2B$ + MoB. |
| $Ta_2O_5$ | 10:1 | {1,600 / 2,000} | $\lambda TaB$. $TaB_2$. |
| $La_2O_3$ | 10:1 | 1,750 | Unidentified, possibly $LaB_6$. |

It is to be noted that these reactions are unique in that many of the metal oxides which react with turbostratic boron nitride are normally regarded as very refractory materials.

The preparation of aluminum nitride by heating a mixture of aluminum oxide and turbostratic boron nitride to a temperature of about 1500° C. provides a convenient and highly useful process for the preparation of refractory aluminum nitride in a state of good purity and is typical of this series of reactions. The reaction apparently involves a disproportionation at the reaction temperature with the formation of aluminum nitride and volatile boric acid:

$$Al_2O_3 + 2BN \rightarrow 2AlN + B_2O_3$$

Since the boric oxide by-product boils at about 1580° C. at atmospheric pressure, it is readily removed from the system, suitable by sweeping the reacting mass with nitrogen or an inert gas such as helium.

When the reaction is effected by heating the mixture of aluminum oxide and boron nitride in a rapid stream of nitrogen, the aluminum nitride produced is deposited as a mass of crystalline needles and plates on a cold surface placed on the downward side of the gas stream from the reaction mass. It is desirable that such "cold" surface be at a lower temperature than the reaction mass, but still be sufficiently hot to avoid undue condensation of boric oxide. The cold surface can suitably be constructed from solid, boron nitride ceramic or other refractory material. Crystalline needles and plates with a maximum dimension of about 1 cm. are readily deposited and grown on such a plate.

Crystalline boron nitrides as made heretofore show only slight or no reaction on heating with aluminum oxide as described above.

The aluminum oxide used in preparation of aluminum nitride as described above is suitably any one of the pure grades of aluminum oxide commercially available. Even refractory aluminum oxide, such as aluminum oxide which has been subjected to a roasting or firing operation at high temperature is operable. Finely divided or colloidal aluminas and particularly aluminas which have not been previously sintered at elevated temperatures show enhanced reactivity. It is desirable, however, that the alumina be free of water of hydration, since the latter reacts with turbostratic boron nitride and thus reduces the yield of aluminum nitride.

The aluminum nitride made as described above is essentially inert to attack by boiling water. In some instances, however, where the material shows a detectable aqueous instability, the water resistance and general refractoriness of the material is further improved by heating and holding for some time at temperatures of about 2000–2200° C.

The aluminum nitride as made by the above methods is highly useful as a refractory, as an abrasive, and as a high temperature thermal insulator and thermal radiation reflector.

The metal borides and nitrides produced according to this invention are useful as refractories, abrasives, metal analogs with unusual electrical and thermal properties, and as metallurgical additives for the production of metal alloys. They are especially useful because they are obtained free of any appreciable metal carbide impurity.

The metal alloys formed by the addition of from 0.01% to 10% by weight of the borides or nitrides thus formed to metals such as iron, titanium, chromium, vanadium, and copper have outstanding hardness and toughness.

Alternatively, metals can be surface-treated by passing them through a metal nitride or boride powder, or they can be treated by packing the nitrides or borides around the metal and heating to a temperature of about 1600° C., the temperature depending upon the particular metal or alloy.

Turbostratic boron nitride can also be used for the surface treating of a variety of metals and metal alloys. In this treatment, the metal or metal alloy is heated while surrounded by the turbostratic boron nitride. The metal or alloy and the surrounding turbostratic boron nitride is heated to a temperature sufficiently great to secure surface reaction of the metal or alloy with the boron nitride, with the resulting formation of a surface layer rich in metal boride and/or nitride. The presence of this chemically altered surface layer confers unusual hardness and toughness on the metal or alloy body. Metals or alloys which are susceptible to improvement by this treatment consist of or contain transition metals.

The turbostratic boron nitride of this invention can be used, in approximately equivalent amounts, to replace part or all the carbon in carbon steels and various other iron alloys. The amount of turbostratic boron nitride used is generally about 2% of the total weight of the metal.

The turbostratic boron nitride products of this invention can also be used in elastomers. The amounts and mode of use approximate those of customary fillers such as carbon black and silica. The turbostratic boron nitride can be used with such elastomers as natural rubber, GRS, polybutadiene, polyisoprene, and other synthetic rubbers. The turbostratic boron nitride may be used in amounts ranging from a fraction of 1% to as high as 50% of the total weight of the elastomer.

The turbostratic boron nitride products produced according to this invention can similarly be used as fillers in such plastic compositions as polyisocyanate, polystyrene, polyethylene, polyvinyl chloride, polymethyl methacrylate, polyacrylate, polyacrylonitrile, polyesters such as "Dacron," and other polymers already well known. These plastics can be in the form of fibers, films, foams, or sponge products. The turbostratic boron nitride can be used in amounts ranging from 0.5% to as high as 50%, and can be used to replace part or all the customary fillers.

It should be noted that when used in elastomers and polymers, as described above, turbostratic boron nitride lends unexpected and valuable strength to these products. This is attributable to the fact that the turbostratic boron nitride is quite active and cross-links such products.

It has heretofore been quite difficult to produce elemental boron of high purity. Now, however, by using turbostratic boron nitride as a starting material, it is possible to obtain elemental boron of high purity simply by heating the turbostratic boron nitride to about 2000° C. as previously described.

The following examples are intended to be illustrative only, and the cooling which is disclosed to facilitate pulverization between the individual stages is not at all essential, since pulverization can be omitted or performed while the mixture is hot. All parts and percentages are by weight unless otherwise specified.

*Example 1*

A mixture of crystal urea (600 g.) and orthoboric acid (309 g.) was mechanically blended and then placed in a glass resin kettle. The resin kettle was equipped with an inlet for nitrogen gas, a paddle stirrer, and a vent connected to a water aspirator. The resin kettle was then heated with infrared lamps, placed to provide fully uniform heating of the mixture. The mixture was melted, with slow stirring, over the temperature range 60–95° C. to give a homogenous nonviscous melt. Simultaneously water began to evolve from the melt. When the melt was homogenous, the pressure was reduced to 50–70 mm. Hg by means of the water aspirator, and the evolving water was rapidly removed. Over a period of about 1 hour, the temperature of the melt was raised from 95 to 125° C. As the temperature was raised and the evolving water was removed, the viscosity of the melt gradually increased and ultimately became sufficiently great to prevent stirring. Over a period of a further hour the temperature was continuously increased. At about 145–160° C., the viscous melt was transformed into a white solid. At temperatures above 145° C., ammonia and other volatiles evolved from the solid and were removed by the water aspirator. A final temperature of about 320° C. was attained. At this stage the material in the resin kettle consisted of a friable, white solid. Heating was then discontinued, nitrogen was bled into the reactor, and the material in the resin kettle was cooled in an atmosphere of dry nitrogen. The residue in the flask weighed 320 g.

Material from 4 runs, performed in the above manner, was mixed, ground, and thoroughly blended in a blender. The resulting blend (447.4 g.) was then placed within a 3″ O.D., quartz tube, mounted vertically, and was supported to form a bed, by a series of fused quartz chips. Dry ammonia gas was then passed vertically through the tube, at a rate of 2.2 liters per minute (S.T.P.). The ammonia flow fluidized the material in the bed. The quartz tube and its contents were enclosed by an electrical resistance furnace, which was used to heat the bed. The temperature of the fluidized bed after 1 hour of heating reached 450° C. At this temperature, reaction of the ammonia gas with the fluidized bed resulted in the formation of water, which was removed in the effluent gas stream. Over a period of a further 2 hours, the temperature of the bed was raised to 900° C., and was then gradually increased to a final temperature of 1150° C. over a final period of 3 hours. The bed was then cooled in a stream of dry nitrogen gas. The resulting boron nitride (95.6 g.) was found on analysis to contain 43.2% B, 54.4% N.

The X-ray diffraction pattern of this material was that of turbostratic boron nitride.

*Example 2*

By means of a mortar and pestle, 60 parts by weight of urea and 30.9 parts of orthoboric acid were intimately mixed together and 90.2 parts of this mixture were placed in a Pyrex flask equipped with an exit tube leading through a condenser, cooled by Dry Ice, to a vacuum pump. The flask was heated, the temperature reaching 95° C. in 9 minutes. The pressure of the system was reduced to about 1 mm. of mercury absolute. At this temperature there was evidence of reaction, namely, condensation of water in the cooler parts of the system. During the next 39 minutes the temperature was brought to 222° C. During this time the mixture became liquid, and about 16 parts of water were released therefrom and were condensed on the cool surfaces of the system. As the heating continued, the viscous liquid was converted to a friable foam-like solid, which amounted to 51.4 parts. A portion of the solid, 4.1070 parts, was transferred to a quartz tube having an inside diameter of 1 inch, in which the solid was heated in a stream of nitrogen. The temperature was brought to 400° C. in 100 minutes, with some condensate accumulating at the cool end of the tube. Heating was continued from 400° C. to 900° C. over an 80-minute period, with a stream of ammonia replacing the stream of nitrogen. The material was held at about 900° C. for 50 minutes, whereupon the ammonia stream was stopped and the reactor cooled. Of the original charge of 4.1070 parts, 0.990 part was recovered as white residue. The residue was pulverized and 0.966 part was returned to the reactor, whereupon a treatment in ammonia at 900° C. was continued for 3 hours. A white residue, 0.9534 part, corresponding to a 96.3% yield based on the boric acid employed, was recovered, which was substantially pure boron nitride (43.9% boron, 54.2% nitrogen).

The X-ray diffraction pattern of this material was that of turbostratic boron nitride.

*Example 3*

By means of a mortar and pestle 39.3 parts of biuret and 15.7 parts of orthoboric acid were intimately mixed and placed in a Pyrex flask. The flask was then heated and when the contents of the flask reached 65° C., there was evidence of reaction, namely, the condensation of water in the cooler portions of the flask. The temperature of the contents of the flask was gradually raised to 123° C. over a 30-minute period, whereupon the mixture in the flask melted, and the melt was heated further over a 50-minute period until the temperature of the contents reached 190° C., at which stage the residue in the flask had become a white solid. This resulting solid was cooled by introducing a stream of nitrogen gas into the flask and 36.4 parts of the solid were recovered from the flask and pulverized. Into a one-inch inside diameter quartz tube was placed 5.6700 parts of the pulverized solid and the quartz tube was placed in a tubular furnace. A means was provided at one end of the quartz tube for the introduction of metered amounts of nitrogen or ammonia gas and a means was provided at the other end to conduct the exit gas to a cold trap. The quartz tube was gradually heated to 700° C. over a 3.5-hour period with a stream of dry nitrogen gas passing through the tube. During this period, water and a white sublimate evolved from the tube. Heating was continued for an additional 2.5 hours at approximately 700° C. (tube wall temperature) without additional formation of sublimate. The tube was then cooled and 1.1961 parts of solid material were recovered which had a Kjeldahl nitrogen content of 31.3%. A portion of this residue (0.9386 part) was replaced in the tube and the tube was heated to and maintained at approximately 850° C. with a stream of ammonia gas passing therethrough for 5.5 hours whence the furnace was cooled and the tube flushed with nitrogen. Of the charge placed in the tube at the beginning of this step, 0.7889 part of a white powder was recovered which analyzed 42.3% boron by sodium carbonate fusion and 48.2% nitrogen by Kjeldahl. The X-ray diffraction pattern of this material was that of turbostratic boron nitride. Triuret is also operable when used as shown in this example.

*Example 4*

Into a flask was added 38.06 parts of thiourea and 30.9 parts of orthoboric acid which has been mixed as in Example 3. The flask was equipped with an exit tube leading through a condenser which was cooled with Dry Ice and thence a vacuum system. The contents of the flask were heated to 68° C. over a 15-minute period, whereupon water evolved and then over a 51-minute period the temperature of the contents was raised to 153° C., whence the pressure in the system was reduced to 2 mm. Hg absolute. The contents of the flask melted at 125° C. Heating was continued for 10 minutes at reduced pressure, during which time the material in the flask solidified and the temperature reached 160° C. Approximately 10 parts of water and 1 part of an immiscible liquid were collected during the above heating cycles. Of the 53.6 parts of residue which were recovered from the flask after cooling, 10.2 parts of the residue were mixed with 7.6 parts of thiourea using a mortar and pestle and 4.3351 parts of the resulting mixture was placed in a quartz tube as described in Example 3. The tube was heated to approximately 700° C. over a 3.5-hour period in a stream of nitrogen gas. A slightly grey powder was recovered (0.7825 part) which analyzed 29.6% boron and 40.4% nitrogen.

A portion (0.4656 part) of the grey residue was readded to the quartz and heated between 730-850° C. for one hour in a stream of ammonia gas. After purging the tube and cooling as shown in Example 2, 0.3795 part of a white boron nitride was recovered which analyzed 40.3% boron and 50.1% nitrogen. The X-ray diffraction pattern of this material was that of turbostratic boron nitride.

*Example 5*

According to the procedure of Example 2, 13.05 parts of orthoboric acid were mixed with 38.1 parts of guanidine carbonate. This mixture, which was slightly sticky in consistency, was added to a flask with an off-gas system as described in Example 4 and heated to 155° C. at 10 mm. Hg absolute vacuum over 2⅓ hours to yield 40.5 parts of a white solid. During this heating period 7.3 parts of water were recovered. A portion of the white solid (1.8062 parts) was gradually heated in a quartz tube with a nitrogen blanket as in Example 3 to 700° C. over a 3-hour period and held at the latter temperature for 1 hour, whereupon 0.3190 part of residue was recovered which analyzed 26.7% boron and 46.4% nitrogen. A portion of the residue (0.2303 part) was then heated in a stream of ammonia gas to 800°-850° C. for 2 hours according to the procedure of Example 4 and 0.1479 part of a white boron nitride was recovered which analyzed 41.4% boron and 50.7% nitrogen. The X-ray diffraction pattern of this material was that of turbostratic boron nitride.

*Example 6*

According to the procedure of Example 3, 68.0 parts of aminoguanidine bicarbonate and 15.4 parts of boric acid were mixed and added to a flask as described in Example 4. This mixture was heated to 126° C. over a 3-hour period under 5 mm. Hg absolute pressure to yield 43.1 parts of a solid residue. A portion of the residue (3.4410 parts) was added to a quartz tube with a nitrogen blanket as described in Example 3 and heated from 200 to 800° C. over a period of 2 hours. The nitrogen flow through the tube was stopped and ammonia gas was fed through the tube while the heat was increased to 900° C. for an additional 3 hours. After purging and cooling as described in Example 3, 0.4893 part of a white boron nitride was recovered which analyzed 41.4% boron and 44.1% nitrogen.

The X-ray diffraction pattern of this material was that of turbostratic boron nitride.

*Example 7*

Into a flask, equipped as described in Example 4, was charged 86.9 parts of thiosemicarbazide and 30.9 parts of orthoboric acid which had been mixed by pulverization. This mixture was heated to 155° C. over a 2-hour period with heating above 85° C. being carried out under a pressure of 5 mm. Hg absolute. Some water was evolved around 85° C. The resulting solid (88.0 parts) was charged to a quartz tube as described in Example 3 and the tube was heated to approximately 700° C. over a period of about 4 hours, whence the nitrogen flow was stopped and ammonia gas was fed through the bed at 700° C.-950° C. for approximately 3 hours. A white residue of boron nitride which analyzed 40.5% boron and 49.0% nitrogen was recovered after purging the tube with nitrogen after the ammonia treatment and cooling. The X-ray diffraction pattern of this material was that of turbostratic boron nitride.

*Example 8*

A mixture obtained by pulverizing 31.5 parts of melamine and 17.2 parts of orthoboric acid was added to a flask equipped as described in Example 4. The mixture then heated slowly and at 66° C. water began to evolve. At 88° C. (20 minutes total heating) the pressure was reduced to 4 mm. Hg absolute and heating was continued for 1⅓ hours to a mixture temperature of about 200° C. After cooling, 44 parts of solid residue were obtained and it was noted that 4.5 parts of water had been evolved. A portion of this residue (23.6 parts) was charged to a quartz tube as described in Example 3 and heated to 900° C. in a stream of nitrogen over a 5-hour period with the temperature over 500° C. for at least 2 hours of heating. The nitrogen stream was then discontinued and ammonia gas was passed through the tube which was held at 800-950° C. for 4 hours. After purging the tube with nitrogen and cooling, 3.3 parts of colorless residue, boron nitride, were recovered which analyzed 42.5% boron and 50.2% nitrogen. The X-ray diffraction pattern of this material was that of turbostratic boron nitride.

*Example 9*

Into a flask, equipped as described in Example 4, was charged 41.3 parts of cyanuric acid and 15.5 parts of orthoboric acid which had been mixed by pulverization. This mixture was heated to 200° C. over a 2-hour period at a pressure of 7 mm. Hg absolute and upon cooling 55.6 parts of residue and 4.7 parts of water were recovered. A portion of the solid residue (26.7 parts) was placed in a quartz tube and the tube was heated to 300° C. over a 1-hour period while a stream of nitrogen was passed therethrough. The stream of nitrogen was discontinued and a stream of ammonia gas was started, the tube was heated to 900° C. over a 3-hour period and maintained at 900-950° C. in a stream of ammonia for an additional 4 hours. After purging the tube with nitrogen followed by cooling 2.7 parts of a white boron nitride residue was recovered which analyzed 41.1% boron and 48.8% nitrogen. The X-ray diffraction pattern of this material was that of turbostratic boron nitride.

*Example 10*

Into a flask, equipped as described in Example 4, was charger 128.1 parts of ammelide and 30.9 parts of boric acid which had been mixed by pulverization. This mixture was heated to 140° C. over a 1.7-hour period with the final heating being effected at a pressure of 2 mm. Hg absolute and upon cooling 154.3 parts of residue and 4 parts of water were recovered. A portion of the solid residue (1.7075 parts) was placed in a quartz tube and the tube was heated to 500° C. over a 3-hour period while a stream of nitrogen was passed therethrough. The stream of nitrogen was discontinued and a stream of ammonia gas was started, whence the tube was heated to 950° C. over a 3.33-hour period and maintained at about 950° C. in the stream of ammonia for an additional 3 hours. After purging the tube with nitrogen followed by cooling, 0.1332 part of a white boron nitride residue was recovered which analyzed 50.6% nitrogen. The X-ray diffraction pattern of this material was that of turbostratic boron nitride.

*Example 11*

Into a flask, equipped as described in Example 4, was charged 45 parts of guanidine carbonate and 30.9 parts orthoboric acid. The mixture was then treated with 30 ml. of glacial acetic acid to convert the guanidine carbonate to guanidine acetate. After the evolution of carbon dioxide had ceased the mixture was heated to 150° C. over a 2-hour period with heating above 114° C. being effected at a pressure of 2 mm. Hg absolute and upon cooling 75.8 parts of residue were recovered. A portion of the solid residue (2.1091 parts) was placed in a quartz tube and the tube was heated to 500° C. over a 3-hour period while a stream of nitrogen was passed therethrough. The stream of nitrogen was discontinued and a stream of ammonia gas was started whence the tube was heated to 950° C. over a 3.3-hour period and maintained at about 950° C. in the stream of ammonia for an additional 2 hours. After purging the tube with nitrogen followed by cooling, 0.3223 parts of a white boron nitride residue amounting to a yield of 93.4% based upon the boric acid originally charged was recovered which analyzed 54.3% nitrogen. The X-ray diffraction pattern of this material was that of turbostratic boron nitride.

*Example 12*

Into a flask, equipped as described in Example 4, was charged 10.0 parts of urea, 15.0 parts of guanidine carbonate, 12.7 parts of thiourea, and 30.9 parts of orthoboric acid which had been mixed by pulverization. This mixture was heated to 220° C. over a 2-hour period with the heating above 100° C. being conducted at a pressure of 2 mm. mercury absolute and upon cooling 46.4 parts of residue and 14.8 parts of water were recovered. A portion of the solid residue (2.209 parts) was placed in a quartz tube and the tube was heated to 500° C. over a 3-hour period while a stream of nitrogen was passed therethrough. The stream of nitrogen was discontinued and a stream of ammonia gas was started whence the tube was heated to 950° C. over a 3.31-hour period and maintained at about 950° C. in the stream of ammonia for an additional 3 hours. After purging the tube with nitrogen followed by cooling, 0.6418 part of a white boron nitride residue were recovered which analyzed 51.8% nitrogen. The X-ray diffraction pattern of this material was that of turbostratic boron nitride.

This example shows that a mixture of the compounds are workable in the process of this invention.

*Example 13*

Turbostratic boron nitride (3.9 grams) made by the process of Example 1 was placed in an open weighed ceramic boat. The boat and its contents were then placed in a horizontal carbon resistance furnace and heated over a 3-hour period in a stream of dry nitrogen to a temperature of 1330° C. The temperature of the boat and its contents was recorded by direct sighting with a calibrated optical pyrometer. The boat and contents were kept at 1330° C. for 2 hours. The temperature was then increased to 1400° C. and maintained at this temperature for 2 hours. Then the temperature was increased to a final temperature of 1550° C. over a final 1-hour heating. Heating was then discontinued and the boat and contents cooled in the nitrogen stream. A white solid (3.4 grams) was recovered.

The X-ray diffraction pattern of this material was that of turbostratic boron nitride, with no evidence of the development of three-dimensional order.

*Example 14*

Turbostratic boron nitride powder (28 grams) which had been prepared according to the process of Example 1 was placed in a graphite mold and heated under pressure. The mold cavity consisted of a hollow cylinder of 2-inch diameter. Pressure was applied to the boron nitride powder in the mold by means of a graphite piston, connected to a hydraulic pressure system capable of exerting a finely controlled pressure. The graphite mold and its contents were bathed in a stream of dry nitrogen during the heating and subsequent cooling. Heat was supplied to the graphite mold by means of an induction coil, connected to a high-frequency power converter. The temperature of the graphite mold, as recorded by an optical pyrometer, was raised to 1700° C. During this heating period the pressure in the mold was 3000 p.s.i. The material in the mold was maintained under 3000 p.s.i. pressure at 1700° C. for 30 minutes. At the end of this period, heating was discontinued and the contents of the mold allowed to cool to room temperature. Pressure was then removed and the mold opened.

A white, compacted, cylindrical chip resulted. The X-ray diffraction pattern of this material was that of turbostratic boron nitride, with no evidence of the development of three-dimensional order.

*Example 15*

Turbostratic boron nitride (1.2 grams), prepared according to the method of Example 1, was mixed with vanadium oxide ($V_2O_4$) (4.12 grams). The mixture was pulverized with an agate pestle and mortar. A portion of the pulverized mixture (2.4 grams) was then placed in a loosely covered ceramic boat and the boat and its contents were then heated in a stream of dry nitrogen within a carbon resistance furnace. The ceramic boat and cover were made by machining a piece of boron nitride ceramic. Prior to use in this experiment, the boat and cover had been slowly heated several times in a stream of dry nitrogen, to a final temperature of 2300° C., until the boat and cover showed no further weight loss on heating. The boat and reaction mixture were heated to 950° C. over a 20-minute period. The temperature was then slowly raised so that a temperature of 1600° C. was attained after 3 hours and a final temperature of 2000° C. was reached after a total heating time of about 8 hours. Heating was then discontinued and the boat and its contents cooled in the stream of nitrogen. A black residue (2.1 grams) of needle-like crystals remained in the boat. X-ray analysis of these crystals positively identified the material as vanadium diboride, $VB_2$.

*Example 16*

A portion (2.6 grams) of a mixture composed of turbostratic boron nitride (1.5 grams) prepared according to the method of Example 1 and tungsten oxide, $WO_3$ (3.45 grams) was heated in a stream of nitrogen, as in Example 8. The following heating schedule was employed:

Temperature, ° C.: Time
  Room temperature→1000 ______ 15 minutes.
  1000–1400 __________________ 2 hours.
  1400 _______________________ 4 hours, 40 minutes.

On cooling, a residue (2.4 grams) remained in the boat. The residue was identified by X-ray analysis as tungsten metal with a minor portion of unreacted boron nitride.

*Example 17*

A portion (1.9 grams) of a mixture of turbostratic boron nitride (2.4 grams) made according to the procedure of Example 1 and niobium oxide (2.65 grams) was heated in a stream of nitrogen as in Example 15 according to the following schedule:

Temperature, ° C.: Time
  Room temperature→1200 __________minutes__ 15
  1200–1400 _______________________hours__ 2
  1400–1500 _______________________hour__ ½
  1500–1700 _______________________hours__ 2
  1700 ____________________________do____ 2

A residue (1.0 gram) of black material identified as δ niobium boride, $Nb_3B_4$ and a minor amount of unreacted components remained in the boat.

Example 18

A portion (5.0 grams) of a mixture of turbostratic boron nitride (2.4 grams) prepared according to Example 1 and zirconium oxide (6.15 grams) was heated, as in Example 15, in a stream of dry nitrogen according to the following schedule:

Temperature, ° C.:                                           Time
    Room temperature→1000 ___________ minutes__ 20
    1000–1400 ________________________ hours__  2
    1400–1700 ________________________ do____   2
    1700–1800 ________________________ hour__   1
    1800 ____________________________ hours__  3

After cooling, a black residue (2.6 grams) remained. This was identified as a mixture of a zirconium diboride phase and a solid solution of zirconium nitride and zirconium boride.

Example 19

A portion (3.65 grams) of a mixture of turbostratic boron nitride prepared according to Example 1 (0.96 gram), and molybdenum oxide, $MoO_3$ (2.88 grams), was heated in a stream of dry nitrogen to 1500° C. over a 1-hour period and then held at 1500° C. for a further period of 4 hours. The reaction mixture was contained in a boron nitride ceramic boat, and the heating was achieved by means of a carbon resistance furnace, as in the preceding examples.

After cooling, a residue (2.75 grams) remained. This was identified by X-ray analysis as a mixture of molybdenum metal, $\alpha Mo_2B$ and some MoB.

Example 20

A portion of a mixture of turbostratic boron nitride (1.2 grams) prepared according to Example 1 and tantalum oxide, $Ta_2O_5$, (2.2 grams) was heated in a stream of dry nitrogen for 7 hours at 1600° C. The sample was contained in a boron nitride ceramic boat which was heated within a carbon resistance furnace. After cooling, 0.5 gram of residue remained. X-ray analysis revealed the residue to be essentially pure λTaB.

Another portion of the mixture, heated to 2000° C. for 4 hours in a stream of nitrogen, yielded $TaB_2$ as the main reaction product.

Example 21

A portion (2.1 grams) of a mixture of turbostratic boron nitride (2.0 grams) made according to the method of Example 1, and nickel oxide, $Ni_2O_3$, (2.12 grams) was heated for 11 hours at 1400° C. in a stream of helium gas. A residue (1.5 grams) was recovered which was shown on analysis to be a mixture of elemental nickel and some boron nitride with a fully developed, three-dimensional, crystalline lattice.

Example 22

Turbostratic boron nitride (6.2 g.), which was prepared by the reaction of urea with boric acid and ammonia, and which on analysis was found to contain 45.2% N, 41.6% B, was mixed with aluminum oxide (10.2 g.) and the mixture was then pulverized with an agate pestle and mortar.

Portions of the mixture (2.2 g. and 3.1 g., respectively) were then placed in open ceramic boats. (Each boat was machined from a solid piece of ceramic boron nitride.) Prior to use, each boat had been fired to constant weight at 2300° C. in a stream of nitrogen. The boats were then placed inside a carbon resistance furnace and heated in a stream of dry nitrogen. The position of the boats was such that the boat which was upstream relative to the $N_2$ flow was fully within the maximum uniform temperature zone, which was about 5" in length, while the downstream boat was partly within the maximum temperature zone and partly in a descending temperature gradient on the downstream side of the maximum temperature zone. An inner sleeve of boron nitride ceramic was inserted into the furnace in the space between the boats and the vent from the furnace, to collect any materials that might deposit in the cool downstream segment of the furnace during the experiment.

The temperature of the furnace (maximum temperature) was then raised according to the following schedule:

Temperature, ° C.:                              Time, hours
    Room temperature→800 ____________________  ½
    800 _____________________________________  ½
    1000 ____________________________________  ½
    1200 ____________________________________  1
    1300 ____________________________________  1
    1400 ____________________________________  1
    1450 ____________________________________  1
    1500 ____________________________________  1
    1600 ____________________________________  1
    1700 ____________________________________  1
    1800 ____________________________________  3

The furnace was then allowed to cool.

The upstream boat, which originally contained 2.2 g. of the mixture, contained 0.1 g. of a white residue. Analysis of the residue indicated this material to be fully crystalline boron nitride. The downstream boat, which originally contained 3.1 g. of the mixture, now contained 1.5 g. residue. The contents of this boat showed a temperature gradient effect. Very little material remained in that portion of the boat which had been in the maximum temperature zone, but the amount of residue showed a progressive increase in the portion of the boat that lay in the temperature gradient. Furthermore, in this portion of the boat there was a surface layer of transparent, crystalline material. Examination of this crystalline material by X-ray analysis revealed it to be aluminum nitride. X-ray analysis indicated that the other components of the residue in the downstream boat were fully crystalline boron nitride and $\eta$-$Al_2O_3$.

A deposit of transparent, fine needles collected on the boron nitride inner sleeve. Examination of this material by X-ray showed it to be essentially $9Al_2O_3 \cdot 2B_2O_3$.

The nitrogen content of the purer products obtained by the process of the present invention indicates virtually pure boron nitride even though the theoretical percent N for BN is 56%; this is possibly because of the low values generally obtained in Kjeldahl analyses of BN due to the limitation of the analytical method. The purest commercial boron nitrides, analyzed by the same procedure, give Kjeldahl values of about 48%–52%.

The invention is highly useful in that it provides a greatly improved method for making a product of established utility and in that it broadens the field of utility for boron nitride by reducing the cost of producing same. In this connection, it is, of course, to be noted that the invention is not restricted to the compounds mentioned herein, since the intermediate products in the practice of the invention are oxygen-containing condensation products of boric acid and a nitrogen-containing compound. This is desirable because these intermediates do not require the use of solid supports, or washing steps which characterize earlier processes for making boron nitride products by the use of ammonia as the source of nitrogen.

The invention claimed is:

1. A process for the production of metal nitrides, said process comprising admixing turbostratic boron nitride and the oxide of a metal selected from the group consisting of aluminum, titanium, and zirconium; heating said mixture to above 1000° C.; and recovering the corresponding metal nitride from said mixture.

2. A process for the production of metal borides, said process comprising admixing turbostratic boron nitride and the oxide of a metal selected from the group consisting of zirconium, vanadium, niobium, chromium, molybdenum, and tantalum; heating said mixture to above 1000° C.; and recovering the corresponding metal boride from said mixture.

References Cited by the Examiner

Mellor "Comprehensive Treatise on Inorganic and Theoretical Chemistry," vol. 8, page 111 (1928).

OSCAR R. VERTIZ, *Primary Examiner.*

MAURICE A. BRINDISI, BENJAMIN HENKIN,
*Examiners.*

J. J. BROWN, *Assistant Examiner.*